(12) United States Patent
Burton et al.

(10) Patent No.: US 11,194,851 B2
(45) Date of Patent: Dec. 7, 2021

(54) ENGAGEMENT SUMMARY GENERATION

(71) Applicant: INTERNATIONAL BUSINESS MACHINES CORPORATION, Armonk, NY (US)

(72) Inventors: Peter H. Burton, Vancouver (CA); Donna K. Byron, Petersham, MA (US); Manvendra Gupta, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 16/785,792

(22) Filed: Feb. 10, 2020

(65) Prior Publication Data
US 2020/0175050 A1 Jun. 4, 2020

Related U.S. Application Data

(63) Continuation of application No. 15/606,107, filed on May 26, 2017, now Pat. No. 10,599,698, which is a
(Continued)

(51) Int. Cl.
*G06F 16/00* (2019.01)
*G06F 16/35* (2019.01)
(Continued)

(52) U.S. Cl.
CPC ....... *G06F 16/35* (2019.01); *G06Q 10/06398* (2013.01); *G06Q 10/063118* (2013.01); *G06Q 10/1091* (2013.01)

(58) Field of Classification Search
CPC ............ G06F 16/35; G06Q 10/063118; G06Q 10/06398; G06Q 10/1091
See application file for complete search history.

(56) References Cited

U.S. PATENT DOCUMENTS 5,664,063 A * 9/1997 Johnson ............... G06Q 10/109
358/1.1
5,855,006 A * 12/1998 Huemoeller ........... G06Q 10/02
705/5
(Continued)

FOREIGN PATENT DOCUMENTS

| EP | 1708105 | 10/2006 |
|---|---|---|
| WO | 2012051713 | 4/2012 |
| WO | 2013003240 | 1/2013 |

OTHER PUBLICATIONS

Well, Peter et al.; "The NIST Definition of Cloud Computing;" National Institute of Standards and Technology; Special Publication 800-145; Sep. 2011; 7 pages.
(Continued)

*Primary Examiner* — Jared M Bibbee
(74) *Attorney, Agent, or Firm* — Schmeiser, Olsen & Watts; Nicholas L. Cadmus (57) ABSTRACT

A method and system for generating summary details is provided. The method includes retrieving event data of associated with a user. Attributes are extracted from the event data and the event data is segmented into logical groups of related activities performed by the user. Key information and associated attributes of each logical group are identified and in response the user is evaluated. The logical groups of related activities are ranked and presented to the user. In response, an engagement summary associated with the user and the logical groups is generated.

20 Claims, 4 Drawing Sheets

Related U.S. Application Data continuation of application No. 14/302,653, filed on Jun. 12, 2014, now Pat. No. 9,703,862.

(51) Int. Cl.
  *G06Q 10/06* (2012.01)
  *G06Q 10/10* (2012.01)

(56) References Cited

U.S. PATENT DOCUMENTS

| | | | |
|---|---|---|---|
| 7,318,040 B2 | 1/2008 | Doss et al. | |
| 7,530,021 B2 * | 5/2009 | Cheng | G06Q 10/109 |
| | | | 705/7.19 |
| 9,703,862 B2 | 7/2017 | Burton | |
| 2002/0069145 A1 | 6/2002 | Collado | |
| 2005/0222890 A1 * | 10/2005 | Cheng | G06Q 10/109 |
| | | | 705/7.19 |
| 2009/0119293 A1 * | 5/2009 | Li | G06F 16/955 |
| 2011/0106892 A1 * | 5/2011 | Nelson | G06Q 10/109 |
| | | | 709/206 |
| 2012/0198414 A1 | 8/2012 | Chen | |
| 2013/0305160 A1 | 11/2013 | Gingras | |
| 2014/0035949 A1 * | 2/2014 | Singh | G06Q 10/109 |
| | | | 345/629 |
| 2014/0317118 A1 * | 10/2014 | Bao | G06Q 10/06 |
| | | | 707/738 |
| 2015/0180818 A1 * | 6/2015 | Chen | H04L 51/32 |
| | | | 715/751 |
| 2015/0222586 A1 * | 8/2015 | Ebersman | G06F 3/04817 |
| | | | 715/752 |
| 2015/0222617 A1 * | 8/2015 | Ebersman | G06F 40/169 |
| | | | 726/4 |
| 2015/0363489 A1 | 12/2015 | Burton | |
| 2017/0262535 A1 | 9/2017 | Burton | |

OTHER PUBLICATIONS

Black, Julie A. et al.; Automated Event Extraction from Email; http://nlp.stanford.edu/courses/cs224n/2004/; Jun. 2, 2004; 12 pages.

Desrochers, David et al.; A Method to Generate an Automatic Retrieval and Statistical Analysis of Event-Based Production Information; IPCOM000134506D; Mar. 7, 2006; 5 pages.

Friedman, Mark J.; List of IBM Patents or patent Applications Treated as Related; Feb. 10, 2020; 1 page.

Yom-Tov, Elad et al.; A Method and system of creating real-time summaries of news events; IPCOM000217627D; May 9, 2012; 7 pages.

* cited by examiner

ENGAGEMENT SUMMARY GENERATION

This application is a continuation application claiming priority to Ser. No. 15/606,107 filed May 26, 2017, now U.S. Pat. No. 10,599,698 issued Mar. 24, 2020, which is a continuation application claiming priority to Ser. No. 14/302,653 filed Jun. 12, 2014 now U.S. Pat. No. 9,703,862 issued Jul. 11, 2017.

FIELD

The present invention relates generally to a method for retrieving user data and in particular to a method and associated system for summarizing details associated with retrieved user data.

BACKGROUND

Monitoring data associated with individuals typically includes an inaccurate process with little flexibility. Organizing the monitored data may include a complicated process that may be time consuming and require a large amount of resources. Accordingly, there exists a need in the art to overcome at least some of the deficiencies and limitations described herein above.

SUMMARY

A first aspect of the invention provides a method comprising: retrieving, by a computer processor of a computing system, event data comprising time stamped artifacts generated during activities performed by a user; extracting, by the computer processor from the event data, attributes associated with the activities performed by the user; segmenting, by the computer processor based on the attributes, the event data into logical groups of related activities associated with the activities performed by the user; identifying, by the computer processor, key information associated with each logical group of the logical groups of related activities with respect to the activities performed by the user; identifying, by the computer processor from the key information, logical group attributes associated with each the logical group; evaluating, by the computer processor executing a sentiment analysis with respect to the event data and communications of the user, the user; ranking, by the computer processor based on results of the evaluating, the logical groups of related activities; presenting, by the computer processor to the user the logical groups of related activities according to results of the ranking; and generating, by the computer processor based on the ranking, an engagement summary associated with the user and the logical groups of related activities.

A second aspect of the invention provides a computing system comprising a computer processor coupled to a computer-readable memory unit, the memory unit comprising instructions that when executed by the computer processor implements a method comprising: retrieving, by the computer processor, event data comprising time stamped artifacts generated during activities performed by a user; extracting, by the computer processor from the event data, attributes associated with the activities performed by the user; segmenting, by the computer processor based on the attributes, the event data into logical groups of related activities associated with the activities performed by the user; identifying, by the computer processor, key information associated with each logical group of the logical groups of related activities with respect to the activities performed by the user; identifying, by the computer processor from the key information, logical group attributes associated with each the logical group; evaluating, by the computer processor executing a sentiment analysis with respect to the event data and communications of the user, the user; ranking, by the computer processor based on results of the evaluating, the logical groups of related activities; presenting, by the computer processor to the user the logical groups of related activities according to results of the ranking; and generating, by the computer processor based on the ranking, an engagement summary associated with the user and the logical groups of related activities.

A third aspect of the invention provides a computer program product, comprising a computer readable hardware storage device storing a computer readable program code, the computer readable program code comprising an algorithm that when executed by a computer processor of a computing system implements a method, the method comprising: retrieving, by the computer processor, event data comprising time stamped artifacts generated during activities performed by a user; extracting, by the computer processor from the event data, attributes associated with the activities performed by the user; segmenting, by the computer processor based on the attributes, the event data into logical groups of related activities associated with the activities performed by the user; identifying, by the computer processor, key information associated with each logical group of the logical groups of related activities with respect to the activities performed by the user; identifying, by the computer processor from the key information, logical group attributes associated with each the logical group; evaluating, by the computer processor executing a sentiment analysis with respect to the event data and communications of the user, the user; ranking, by the computer processor based on results of the evaluating, the logical groups of related activities; presenting, by the computer processor to the user the logical groups of related activities according to results of the ranking; and generating, by the computer processor based on the ranking, an engagement summary associated with the user and the logical groups of related activities.

The present invention advantageously provides a simple method and associated system capable of monitoring data.

DETAILED DESCRIPTION

Figure 1:
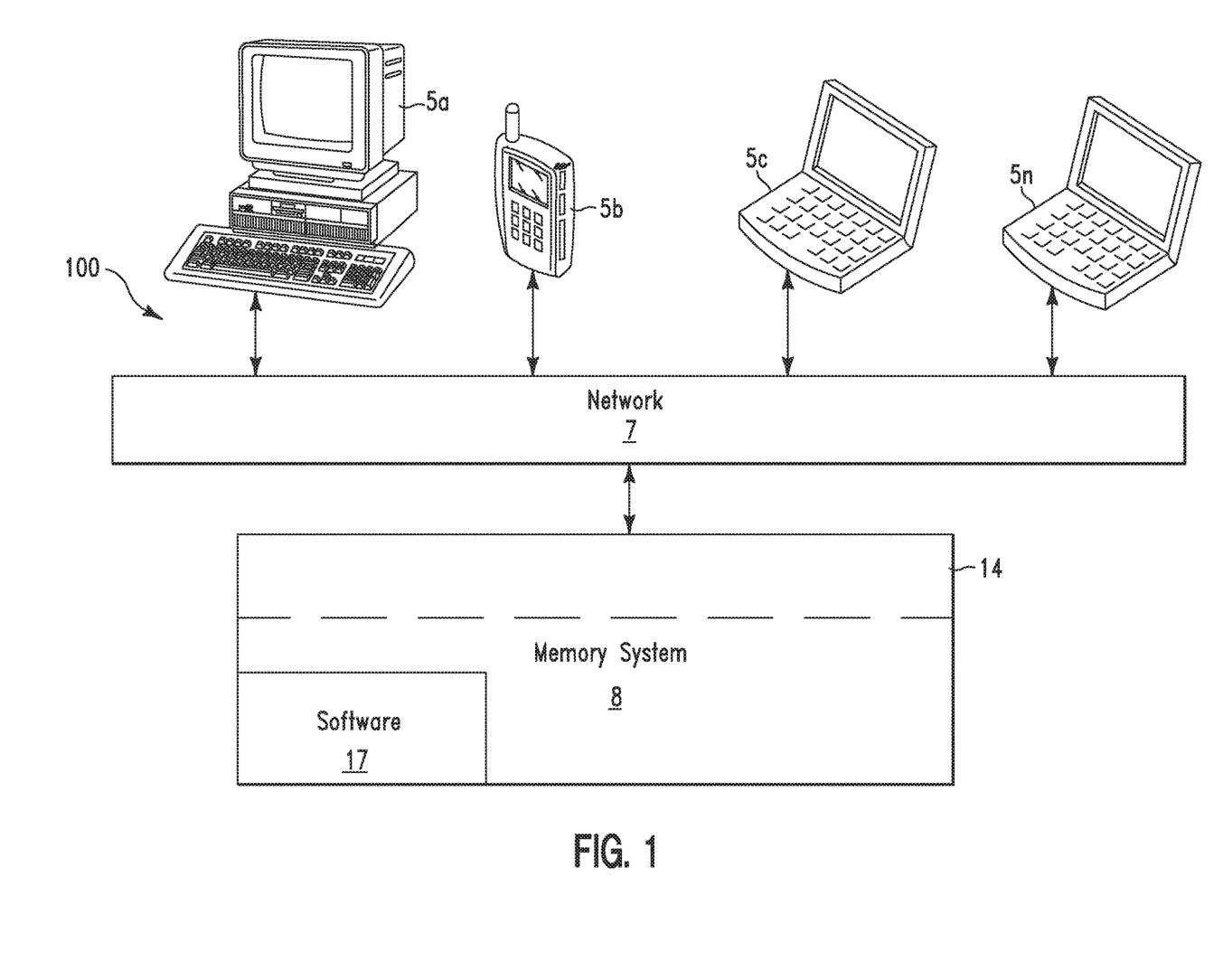
FIG. 1 illustrates a system for enabling a process for generating an engagement summary from event sources, in accordance with embodiments of the present invention.

FIG. 1 illustrates a system 100 for enabling a process for generating an engagement summary from event sources, in accordance with embodiments of the present invention. System 100 performs a process for generating a summary of work or professional experience for, inter alia, writing resumes, applying for job openings, applying or re-certifying for a technical certification, etc.

System 100 of FIG. 1 includes devices 5a . . . 5n connected through a network 7 to a computing system 14. Network 7 may include any type of network including, inter alia, a local area network, (LAN), a wide area network (WAN), the Internet, a wireless network, etc. Devices 5a . . . 5n may include any type of computing devices or software systems including, inter alia, a computer (PC), a laptop computer, a tablet computer, a server, a PDA, a smart phone, a secure Website, an application, etc. Computing system 14 may include any type of computing system(s) including, inter alia, a computer (PC), a laptop computer, a tablet computer, a server, etc. Computing system 14 includes a memory system 8. Memory system 8 may include a single memory system. Alternatively, memory system 8 may include a plurality of memory systems. Memory system 8 includes software 17.

System 100 enables a process for generating summary details from a calendar, an email, or a community invite event as follows:

1. A set of time-stamped artifacts is received. The set of time-stamped artifacts represent professional activities forming an evidence stream. The set of time-stamped artifacts may include, inter alia, emails, calendar invites, personal activity logs, communities and associated documents, etc. Each type of artifact requires a dedicated information extraction process performed for an associated format using a selected library for a dedicated relation extraction/targeted information extraction process associated with relevant information such as, inter alia, customer satisfaction, project risks and challenges, a set of predefined extractors, etc.
2. An evidence stream is segmented into projects via discovery of a project start/end time.
3. Key information for each project discovered is identified. The identification process may include locating attributes describing each user participation/contribution and identify roles/IDs with respect to project participants that may include, inter alia, a customer, a customer executive, in-house colleagues, team members, subordinates, etc.
4. Attributes of a specific project are located. The attributes may include technology used, an industry associated with a client in a respective project, a size of a team of the respective project.
5. Recognition points within the documents associated with the respective project/episode cluster are located by performing a sentiment analysis with respect to a communication from a specific client or externally posted information and quantitative markers of project success.
6. Projects are ranked in terms of relevance in response to a prompt from an application being completed. The prompt comprises a selected prompt from a plurality of prompts including a request to describe a project and work function via a specified scripting language. Associated candidate activities are judged to match information specified in a template through various similarity judgments including, inter alia, evidence of a topical match using semantic and entity analytics against an agenda/description of a specified event. Information associated with attendees or audience at a specified event is retrieved from personal profiles or information present within the set of time-stamped artifacts including, inter alia, contact lists, etc. The information is enriched through mining external attendee information using links to information within social media repositories.

System 100 enables a process for mining a personal information manager (PIM) or a calendar to extract attributes for:

1. Extracting attributes from any source storing event information (for an event) stored within source control repositories, etc.
2. Building a list of activities and tasks performed over a history of the event source information via topical matches (e.g., employed by semantic and entity analytics) or additional methods such as, inter alia, training a learning model.
3. Summarizing a plurality of historical and future engagements.
4. Determining a collaborative network of people including active participants and secondary participants.
4. Determining a structure of a network by identifying associated colleagues (e.g., employees) and non-employees (e.g., customers).
5. Linking related events by participants, theme (subject), time period, keywords, etc.
6. Preparing a template comprising a desired output format based on information. For example, text prompts describing elements to be completed in an application may be phrased as a question (e.g., do you have experience with making presentations to external clients) or as statements associated with a desired credential (e.g., briefly explain activities performed by a nominee to support a nomination in the area of a mentorship). Therefore, the text prompts are modeled as templates for a type of information to be extracted.

System 100 executes a deep natural language software application to examine evidence of activities from within a user's calendar, activity logs (e.g., software change management tool logs, PIM data repositories, etc.) and extract activity details in accordance with requirements expressed in a prompt/template. System 100 extracts desired information and populates the information into a job application, a certification application, etc. The information extracted is utilized with a specific orientation dependent on how it is associated with personal (user) participation in a project. For example, an email transmitted to a user comprises evidence for user contribution while an email transmitted from a customer may be used to locate bragging points. Therefore, contents of specific documents (i.e., a message or slide deck) are contextualized in terms of the role of the document author. Additionally, system 100 locates targeted information to highlight within artifacts created for a specific project. For example, only the relevant events/projects and attributes of projects presenting information relevant to the template being completed are selected.

System 100 executes an algorithm for creating a customized timeline with episode (project) boundaries. Each episode is populated with links to evidence sources describing key relations and key activities (e.g., activities of an entire project group and user generated activities) relevant to information requested in the template. The customized timeline is generated based on input data comprising a set of time-stamped artifacts generated during professional activities. For example, input data may include emails (with attachments), calendar invites with subjects/agendas/descriptions/attendees list (with attachments), personal activity logs and communities and associated documents, an email body, slide decks, etc. Each type of input data is associated with a dedicated information extraction process for an associated format (e.g., a custom information extraction from slide deck where slide titles comprise section headings associated with articles). For example, system 100 may include a plurality of libraries for performing a dedicated relation extraction process or a targeted information extraction process associated with relevant information in common areas. The relevant information may include as customer satisfaction data, project risks and challenges data, project personnel data, etc. The relevant information may be identified using a rough granularity (topic detection) or fine-grained (relation extraction) method.

System 100 enables a process for ranking relevant summary details retrieved from a calendar, an email, or a community invite event as follows:

1. Evidence streams are segmented into projects. Activities for each project are organized based on a temporal analysis
2. Key information for each project is identified by:
   A. Locating attributes describing user participation/contribution and identifying roles/IDs of additional project participants such as a customer, a customer executive, in-house colleagues team members, subordinates, etc.
   B. Locating attributes describing the project. Attributes may include technology used, an industry associated with a client, team size, etc.
   C. Locating bragging points within documents associated with the project/episode cluster. Bragging points may include, inter alia, a project evaluation, a personal evaluation, awards for exceeding expectations, completing projects ahead of schedule, taking an initiative, etc. The bragging points may be located by performing a sentiment analysis with respect to communications from a client and associated externally posted information (e.g., press release or internal blog posting) indicating a customer satisfaction level.
   D. Performing analytics with respect to primary data elements. For example, locating emails expressing customer satisfaction, categorizing an audience for an emailed document sent by the user, noticing when the user is the first to originate an idea, etc.
3. Episodes and projects are ranked in terms of relevance compared to a particular prompt from an application being completed. For example, describing a project with high customer satisfaction, describing a thought leader role, describing work using python or another scripting language, etc. Candidate activities may be judged to match desired information specified in the template through various similarity judgments, including, inter alia:
   A. Evidence of topical matches with respect to semantic and entity analytics against an agenda/description of an event.
   B. Information regarding attendees or audience members at the event gathered from personal profiles or information present within PIM.

Attachments (such as a presentation slide deck attached to a calendar entry or additional multi-media files associated with an event) may be examined to determine a topic, a level of technical detail, an audience for a presentation, a time/date/place, a rhetorical mode of the information presented (e.g., whether it was a training, a sales pitch, an executive summary, etc.). For example, if a template requests mentoring activities, system 100 will rate an entry describing a topic of the mentoring and an associated role as having a high match score. Likewise, if the template requests evidence related to an applicant developing Python code, a template filling module may produce sentences describing a purpose and size of a coding effort. The aforementioned targeted information presentation may be created via, inter alia, a library of rule-based modules designed to locate and format particular classes of information (e.g., personal information vs. skills) or using statistical NLP along with entity analytics.

An implementation example associated with rating a match between extracted information and a template/form is described as follows:

If targeted information (as described, supra) comprises a pre-specified confidence threshold, the information is filed into an application automatically. If the information is located and organized as evidence for a user, the user completes the template/form.

An implementation example associated with interactive mode is described as follows:

A user provides examples or seeds for types of interactions/events sought. In addition to using textual prompts within an application to be completed, a user may provide inputs to guide system 100 to information for extraction. For example:

1. Locating examples associated with a user mentoring process with respect to inventors and associated patents
2. Locating examples associated with a user presentation or demoed software capabilities to external clients.
3. Locating examples associated with a user presentation of project summaries to executives.
4. Delivered tasks associated with a Java component using machine learning.

Figure 2:
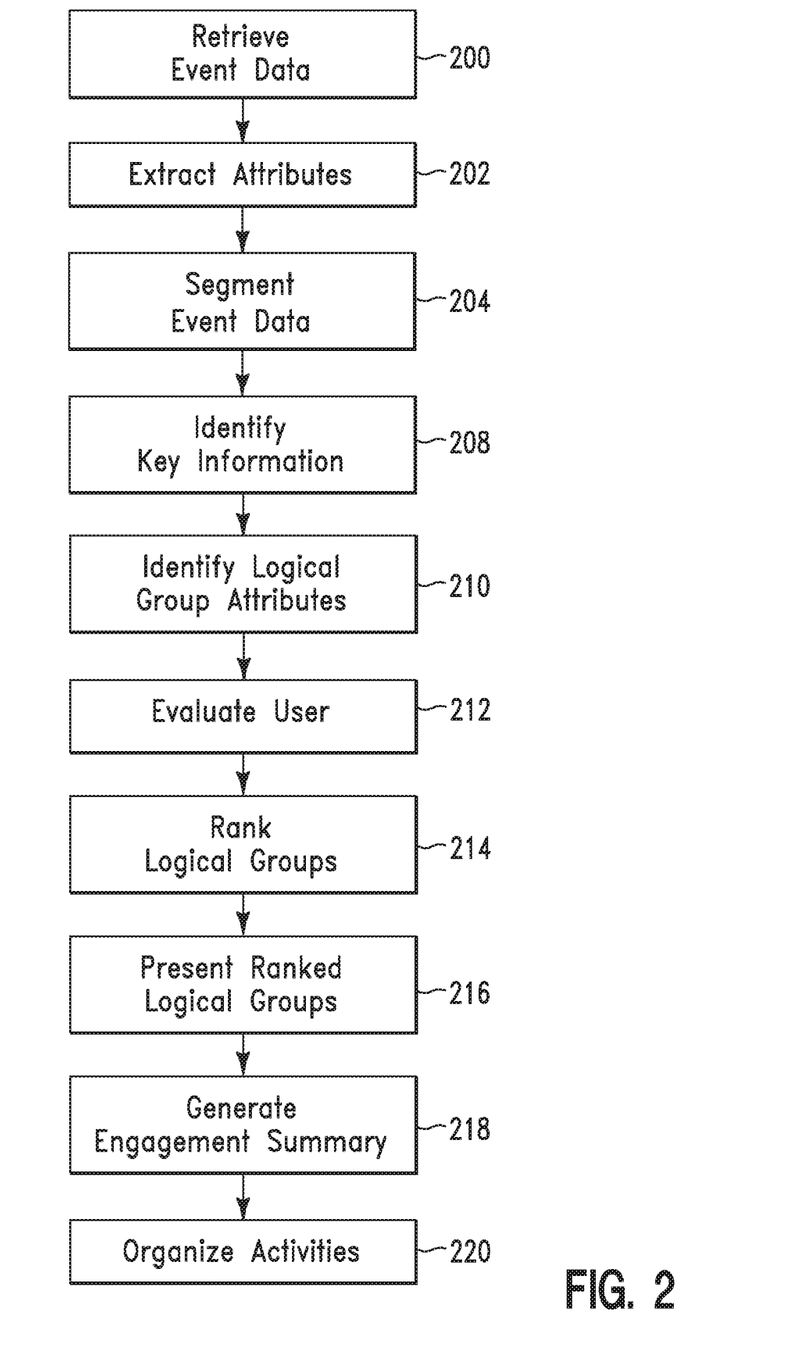
FIG. 2 illustrates an algorithm detailing a process flow enabled by the system of FIG. 1 for performing a ranking method for generating a summary of user experience, in accordance with embodiments of the present invention.

FIG. 2 illustrates an algorithm detailing a process flow enabled by system 100 of FIG. 1 for performing a ranking method for generating a summary of user experience, in accordance with embodiments of the present invention. Each of the steps in the algorithm of FIG. 2 may be enabled and executed in any order by a computer processor executing computer code. In step 200, event data is retrieved. The event data may include time stamped artifacts generated during activities performed by a user. The time stamped artifacts may include emails, personal information managers (PIMS), personal activity logs, associated attachments, etc. In step 202, attributes are extracted from the event data. The attributes are associated with the activities performed by the user. Extracting the attributes may include performing a dedicated information extraction process for an associated format using a selected library for extracting targeted information from common areas of the event data. The targeted information may include customer satisfaction information, logical group risk and challenge information, logical personnel information, etc. In step 204, the event data is segmented (based on the attributes) into logical groups of related activities associated with the activities performed by the user. In step 208, key information associated with each logical group of related activities with respect to the activities performed by the user is identified. Identifying the key information may include:

1. Locating user attributes describing user participation and contribution associated with the user.
2. Identifying roles/IDs of participants of the logical groups of related activities.

In step 210, logical group attributes associated with each logical group are identified based on the key information. In step 212, the user is evaluated by a computer processor executing a sentiment analysis with respect to the event data and communications of the user. The evaluation may include locating recognition points within documents associated with respective logical group/episode clusters.

In step 214, the logical groups of related activities are ranked based on results of the evaluation of step 212. Ranking the logical groups may include:

1. Performing a ranking process with respect to the logical groups of related activities in terms of relevance in response to a specified prompt from an application being completed. The specified prompt may include:
   A. A request to describe a logical group with a high customer satisfaction.
   B. A request to describe a leader role.
   C. A request to describe a work function using a specified scripting language.
2. Matching user activities with information specified in a template via executing similarity judgment algorithms. The similarity judgment algorithms may include:
   A. An evidence of topical matching algorithm using semantic and entity analytics against an agenda/description of a specified event.
   B. An information algorithm associated with attendees of said specified retrieved from personal profiles of social media repositories associated with a user.
   C. An attachment algorithm associated with attachments including a presentation slide deck attached to a calendar entry associated with the specified event or multi-media files associated with the specified event.

In step 216, the logical groups of related activities are presented to the user according to results of ranking of step 214. In step 218, an engagement summary associated with the user and the logical groups of related activities is generated. In step 220, the activities are organized by a computer processor executing a temporal analysis algorithm.

Figure 3:
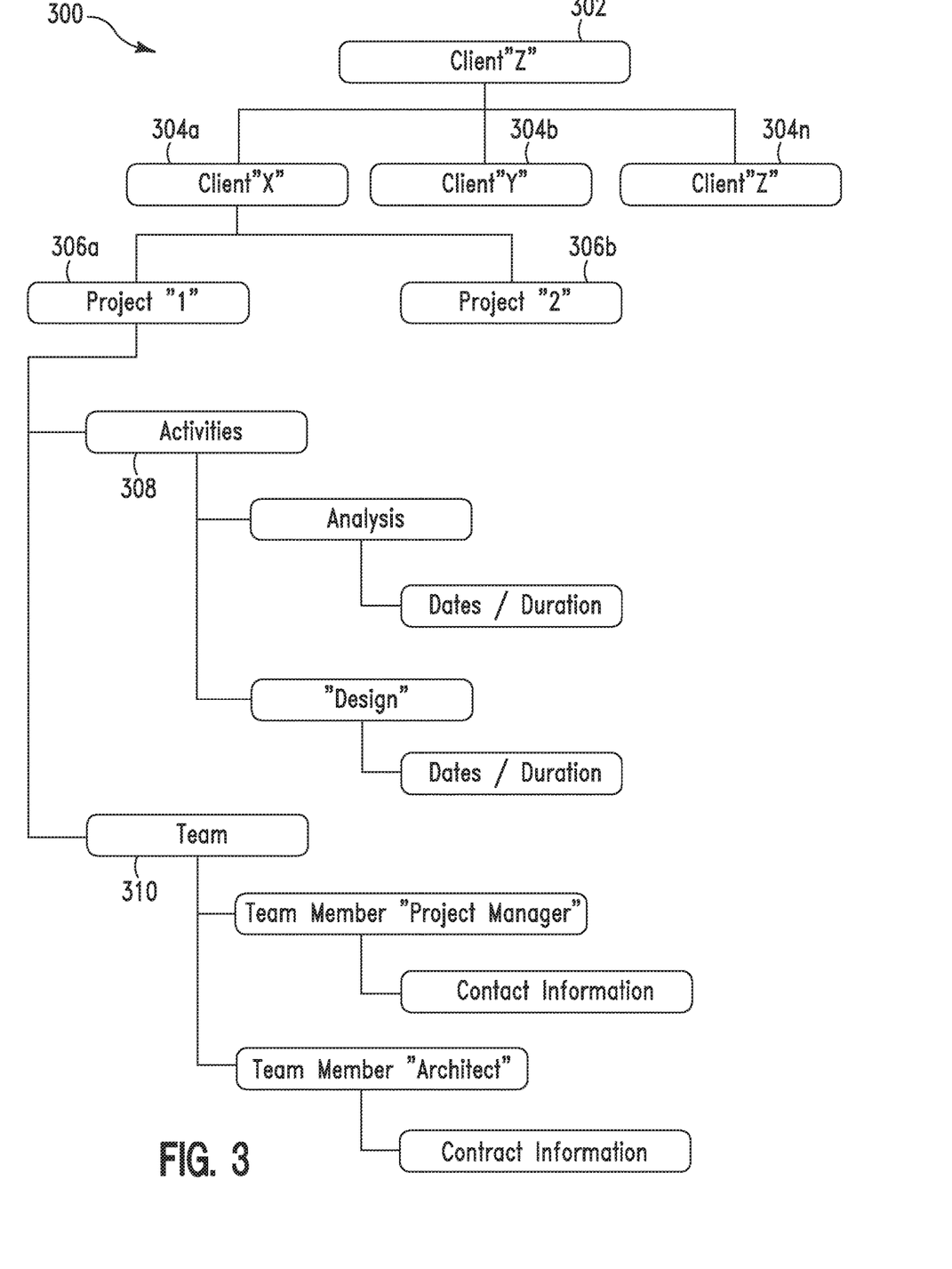
FIG. 3 illustrates an implementation example describing an algorithm for generating a timeline, in accordance with embodiments of the present invention.

FIG. 3 illustrates an implementation example describing an algorithm 300 for generating a timeline, in accordance with embodiments of the present invention. In the example, an employee (of a company) begins work in a job role allocated to clients 304a . . . 304n. Each of clients 304a . . . 304n may be associated with any of projects 306a . . . 306n running in parallel. For example, there may be a calendar entry for a project starting in February 2011 and the last project entry in August 2013. Each of projects 306a . . . 306n may be associated with different phases 308 or 310 associated with different types of work to be performed. For example:
1. February 2011-April 2011 comprises a conception phase.
2. April 2011-August 2011 comprises an elaboration phase.
3. September 2011-January 2012 comprises a contract & negotiations phase.
4. February 2012-July 2012 comprises a construction phase.
5. August 2012-February 2013 comprises a handover phase.
6. March 2013-August 2013 comprises a project closure phase.

Different individuals (company employees and external personal) may be involved at each of different phases 308 or 310. Individuals involved during a conception phase may not be available during a construction phase. For example, a subset of the same individuals may be engaged on a different activity simultaneously. Algorithm 300 illustrates the how system 100 (of FIG. 1) processes available PIM data pertaining to tenure of an employee. Algorithm 300 additionally illustrates how information mined from PIM sources will be organized into a hierarchical linked structure that provides a summary of the employee's tenure with links to the relevant details and evidence. Algorithm 300 uses natural language processing to mine the PIM data, derive the hierarchical experience model, and create the links to supporting evidence (e.g., projects, durations, team members, etc.) and derived details (e.g., team member contact details from an online address book).

Figure 4:
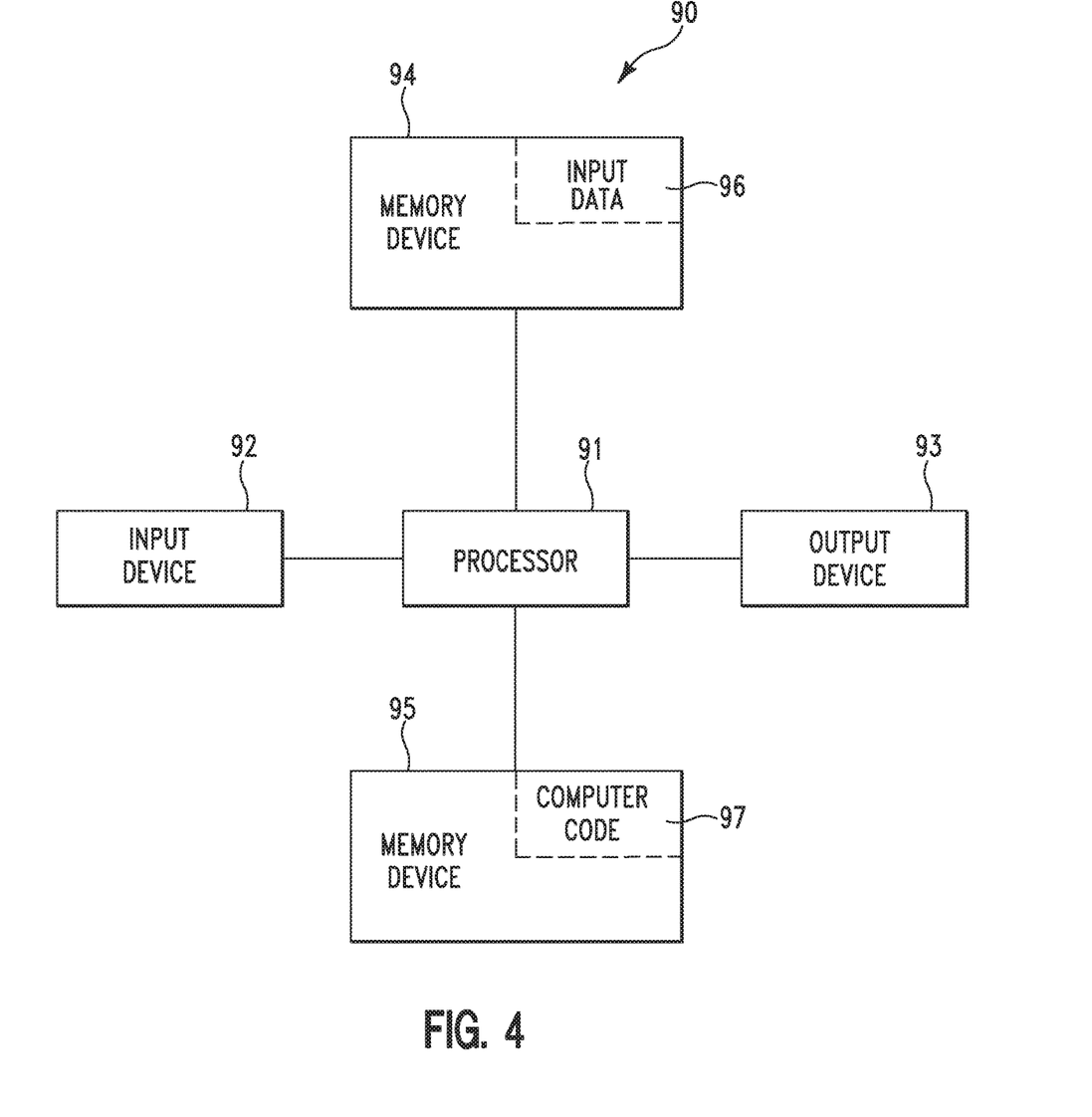
FIG. 4 illustrates a computer system used by the system of FIG. 1 for enabling a process for generating an engagement summary from event sources, in accordance with embodiments of the present invention.

FIG. 4 illustrates a computer system 90 used by or comprised by the system of FIG. 1 for enabling a process for generating an engagement summary from event sources, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for enabling a process for generating an engagement summary from event sources. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may include the algorithms of FIGS. 2 and 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to enable a process for generating an engagement summary from event sources. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for generating an engagement summary from event sources. In another embodiment, the invention provides a business method that performs the process steps of the invention on a subscription, advertising, and/or fee basis. That is, a service supplier, such as a Solution Integrator, could offer to enable a process for generating an engagement summary from event sources. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:

extracting, by a computer processor of a computing system from event data comprising time stamped artifacts generated during activities performed by a user, attributes associated with said activities performed by said user;

identifying, by said computer processor, key information comprising logical group attributes associated with each logical group of logical groups of related activities with respect to said activities performed by said user;

evaluating, by said computer processor executing a sentiment analysis with respect to said event data and communications of said user, said user;

determining, by said processor, a structure of a network by identifying colleagues associated with said user;

linking, by said processor based on said structure, related events of said event data based on a theme and time period;

ranking, by said computer processor based on results of said evaluating and said linking, said logical groups of related activities, wherein said ranking comprises:

performing a ranking process with respect to said logical groups of related activities in terms of relevance in response to a specified prompt from an application being completed, wherein said specified prompt is a selected from the group consisting of a request to describe a logical group with a high customer satisfaction, a request to describe a leader role, and a request to describe a work function using a specified scripting language; and matching user activities of said user with information specified in a template via executing similarity judgment algorithms, wherein similarity judgment algorithms comprise algorithms selected from the group consisting of an evidence of topical matching algorithm using semantic and entity analytics against an agenda/description of a specified event, an information algorithm associated with attendees of said specified retrieved from personal profiles of social media repositories associated with said user, and an attachment algorithm associated with attachments including a presentation slide deck attached to a calendar entry associated with the specified event or multi-media files associated with said specified event;

presenting, by said computer processor to said user said logical groups of related activities according to results of said ranking; and generating, by said computer processor based on said ranking, an engagement summary associated with said user and said logical groups of related activities.

2. The method of claim 1, wherein said time stamped artifacts comprise artifacts selected from the group consisting of emails, personal information managers (PIMS), personal activity logs and associated attachments.

3. The method of claim 1, wherein said extracting said attributes comprises performing a dedicated information extraction process for an associated format using a selected library for extracting targeted information from common areas of said event data.

4. The method of claim 3, wherein said targeted information is selected from the group consisting of customer satisfaction information, logical group risk and challenge information, and logical personnel information.

5. The method of claim 1, further comprising:

organizing, by said computer processor executing a temporal analysis algorithm, said activities.

6. The method of claim 1, wherein said identifying said key information comprises:

locating user attributes describing user participation and contribution associated with said user; and identifying roles/IDs of participants of said logical groups of related activities.

7. The method of claim 1, wherein said evaluating said user comprises:

locating recognition points within documents associated with respective logical group/episode clusters.

8. The method of claim 1, further comprising:

providing at least one support service for at least one of creating, integrating, hosting, maintaining, and deploying computer-readable code in the computing system, said code being executed by the computer processor to implement: said extracting, said identifying said key information, said evaluating, said ranking, said presenting, and said generating.

9. A computing system comprising a computer processor coupled to a computer-readable memory unit, said memory unit comprising instructions that when executed by the computer processor implements a method comprising:

extracting, by said computer processor from event data comprising time stamped artifacts generated during activities performed by a user, attributes associated with said activities performed by said user;

identifying, by said computer processor, key information comprising logical group attributes associated with each logical group of logical groups of related activities with respect to said activities performed by said user;

evaluating, by said computer processor executing a sentiment analysis with respect to said event data and communications of said user, said user;

determining, by said processor, a structure of a network by identifying colleagues associated with said user;

linking, by said processor based on said structure, related events of said event data based on a theme and time period;

ranking, by said computer processor based on results of said evaluating and said linking, said logical groups of related activities, wherein said ranking comprises:

performing a ranking process with respect to said logical groups of related activities in terms of relevance in response to a specified prompt from an application being completed, wherein said specified prompt is a selected from the group consisting of a request to describe a logical group with a high customer satisfaction, a request to describe a leader role, and a request to describe a work function using a specified scripting language; and matching user activities of said user with information specified in a template via executing similarity judgment algorithms, wherein similarity judgment algorithms comprise algorithms selected from the group consisting of an evidence of topical matching algorithm using semantic and entity analytics against an agenda/description of a specified event, an information algorithm associated with attendees of said specified retrieved from personal profiles of social media repositories associated with said user, and an attachment algorithm associated with attachments including a presentation slide deck attached to a calendar entry associated with the specified event or multi-media files associated with said specified event;

presenting, by said computer processor to said user said logical groups of related activities according to results of said ranking; and generating, by said computer processor based on said ranking, an engagement summary associated with said user and said logical groups of related activities.

10. The computing system of claim 9, wherein said time stamped artifacts comprise artifacts selected from the group consisting of emails, personal information managers (PIMS), personal activity logs and associated attachments.

11. The computing system of claim 9, wherein said extracting said attributes comprises performing a dedicated information extraction process for an associated format using a selected library for extracting targeted information from common areas of said event data.

12. The computing system of claim 11, wherein said targeted information is selected from the group consisting of customer satisfaction information, logical group risk and challenge information, and logical personnel information.

13. The computing system of claim 9, wherein said method further comprises:
organizing, by said computer processor executing a temporal analysis algorithm, said activities.

14. The computing system of claim 9, wherein said identifying said key information comprises:
locating user attributes describing user participation and contribution associated with said user; and
identifying roles/IDs of participants of said logical groups of related activities.

15. The computing system of claim 9, wherein said evaluating said user comprises:
locating recognition points within documents associated with respective logical group/episode clusters.

16. A computer program product, comprising a computer readable hardware storage device storing a computer readable program code, said computer readable program code comprising an algorithm that when executed by a computer processor of a computing system implements a method, said method comprising:
extracting, by said computer processor from event data comprising time stamped artifacts generated during activities performed by a user, attributes associated with said activities performed by said user;
identifying, by said computer processor, key information comprising logical group attributes associated with each logical group of logical groups of related activities with respect to said activities performed by said user;
evaluating, by said computer processor executing a sentiment analysis with respect to said event data and communications of said user, said user;
determining, by said processor, a structure of a network by identifying colleagues associated with said user;

linking, by said processor based on said structure, related events of said event data based on a theme and time period;

ranking, by said computer processor based on results of said evaluating and said linking, said logical groups of related activities, wherein said ranking comprises:
performing a ranking process with respect to said logical groups of related activities in terms of relevance in response to a specified prompt from an application being completed, wherein said specified prompt is a selected from the group consisting of a request to describe a logical group with a high customer satisfaction, a request to describe a leader role, and a request to describe a work function using a specified scripting language; and
matching user activities of said user with information specified in a template via executing similarity judgment algorithms, wherein similarity judgment algorithms comprise algorithms selected from the group consisting of an evidence of topical matching algorithm using semantic and entity analytics against an agenda/description of a specified event, an information algorithm associated with attendees of said specified retrieved from personal profiles of social media repositories associated with said user, and an attachment algorithm associated with attachments including a presentation slide deck attached to a calendar entry associated with the specified event or multi-media files associated with said specified event;

presenting, by said computer processor to said user said logical groups of related activities according to results of said ranking; and generating, by said computer processor based on said ranking, an engagement summary associated with said user and said logical groups of related activities.

17. The computer program product of claim 16, wherein said time stamped artifacts comprise artifacts selected from the group consisting of emails, personal information managers (PIMS), personal activity logs and associated attachments.

18. The computer program product of claim 16, wherein said extracting said attributes comprises performing a dedicated information extraction process for an associated format using a selected library for extracting targeted information from common areas of said event data.

19. The computer program product of claim 18, wherein said targeted information is selected from the group consisting of customer satisfaction information, logical group risk and challenge information, and logical personnel information.

20. The computer program product of claim 16, wherein said method further comprises:
organizing, by said computer processor executing a temporal analysis algorithm, said activities.

* * * * *